United States Patent [19]

Zwirn

[11] 4,107,677
[45] Aug. 15, 1978

[54] GATE TRACKING TECHNIQUE UTILIZING DIMENSION MEMORY

[75] Inventor: Robert Zwirn, Encino, Calif.

[73] Assignee: The United States of America as represented by the Secretary of the Air Force, Washington, D.C.

[21] Appl. No.: 274,540

[22] Filed: Jul. 25, 1972

[51] Int. Cl.² .................................................. G01S 9/02
[52] U.S. Cl. .................................... 343/7 A; 343/5 DP
[58] Field of Search .............................. 343/5 DP, 7 A

[56] References Cited

U.S. PATENT DOCUMENTS

| 3,151,322 | 9/1964 | Hildebrandt | 343/7 A X |
| 3,353,177 | 11/1967 | Wilmot | 343/5 DP |
| 3,412,397 | 11/1968 | Evans | 343/5 DP |

Primary Examiner—Malcolm F. Hubler
Attorney, Agent, or Firm—Joseph E. Rusz; William Stepanishen

[57] ABSTRACT

A target tracking apparatus to accurately measure the position and dimensions of a target and to adjust the size and position of the tracking gate such that it circumscribes the target. The target dimensions are determined and stored in a dimension memory and are utilized to supplement the incomplete data which occurs when the target is only partially within the tracking gate.

4 Claims, 5 Drawing Figures

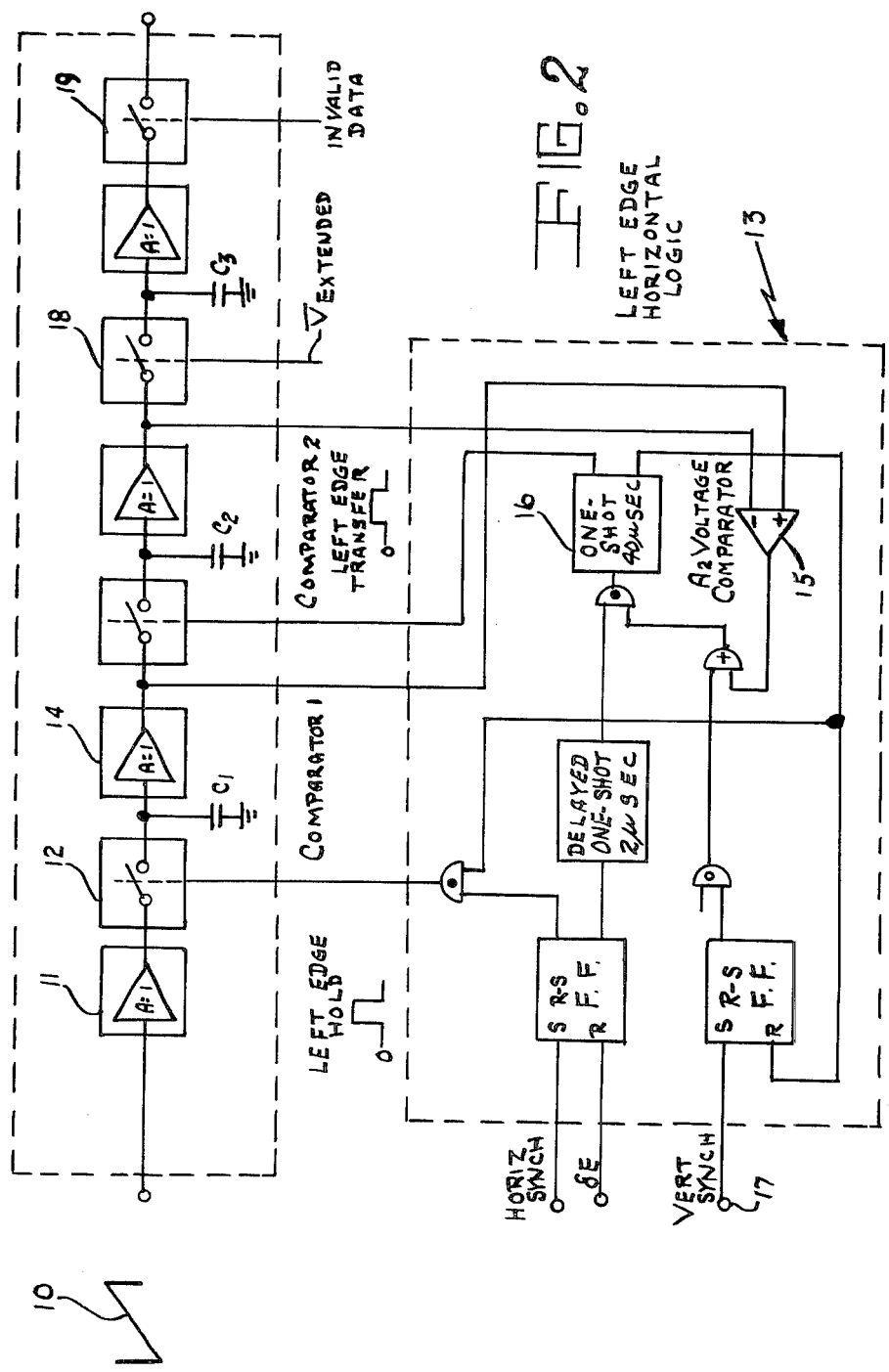

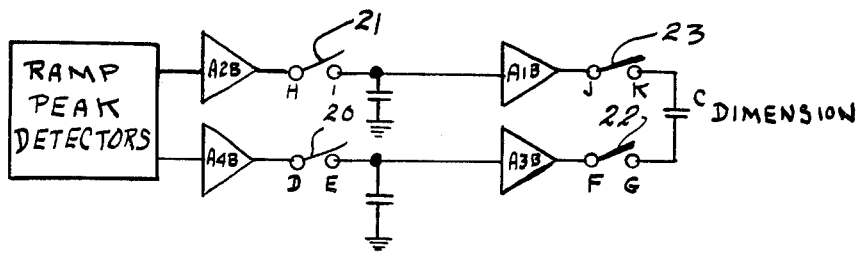
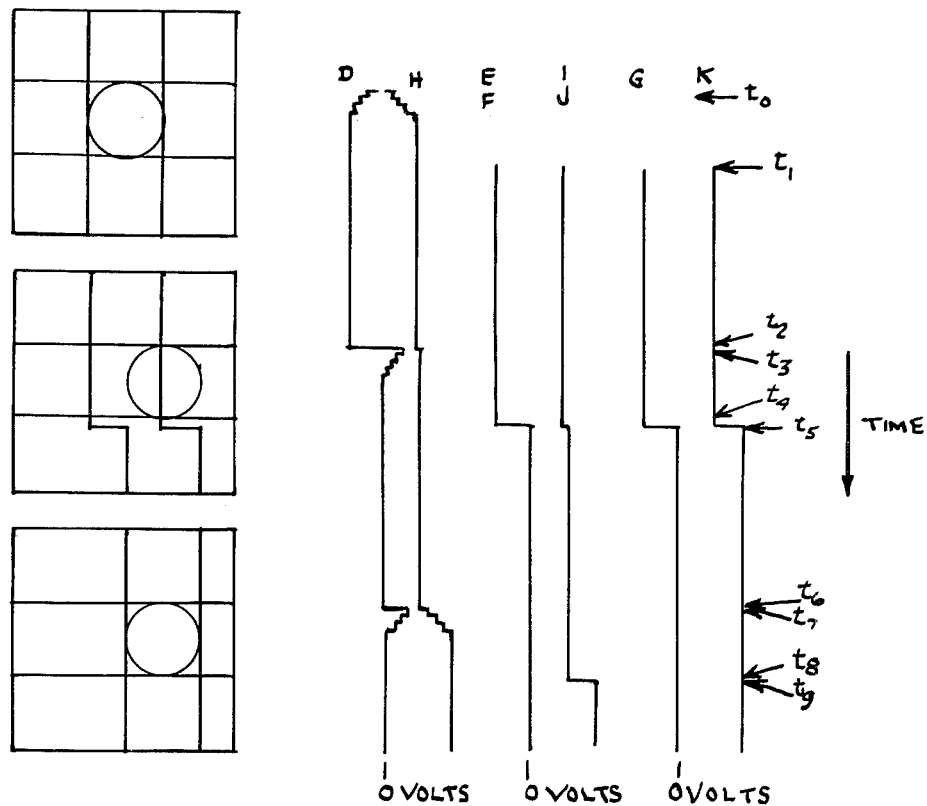
FIG. 3

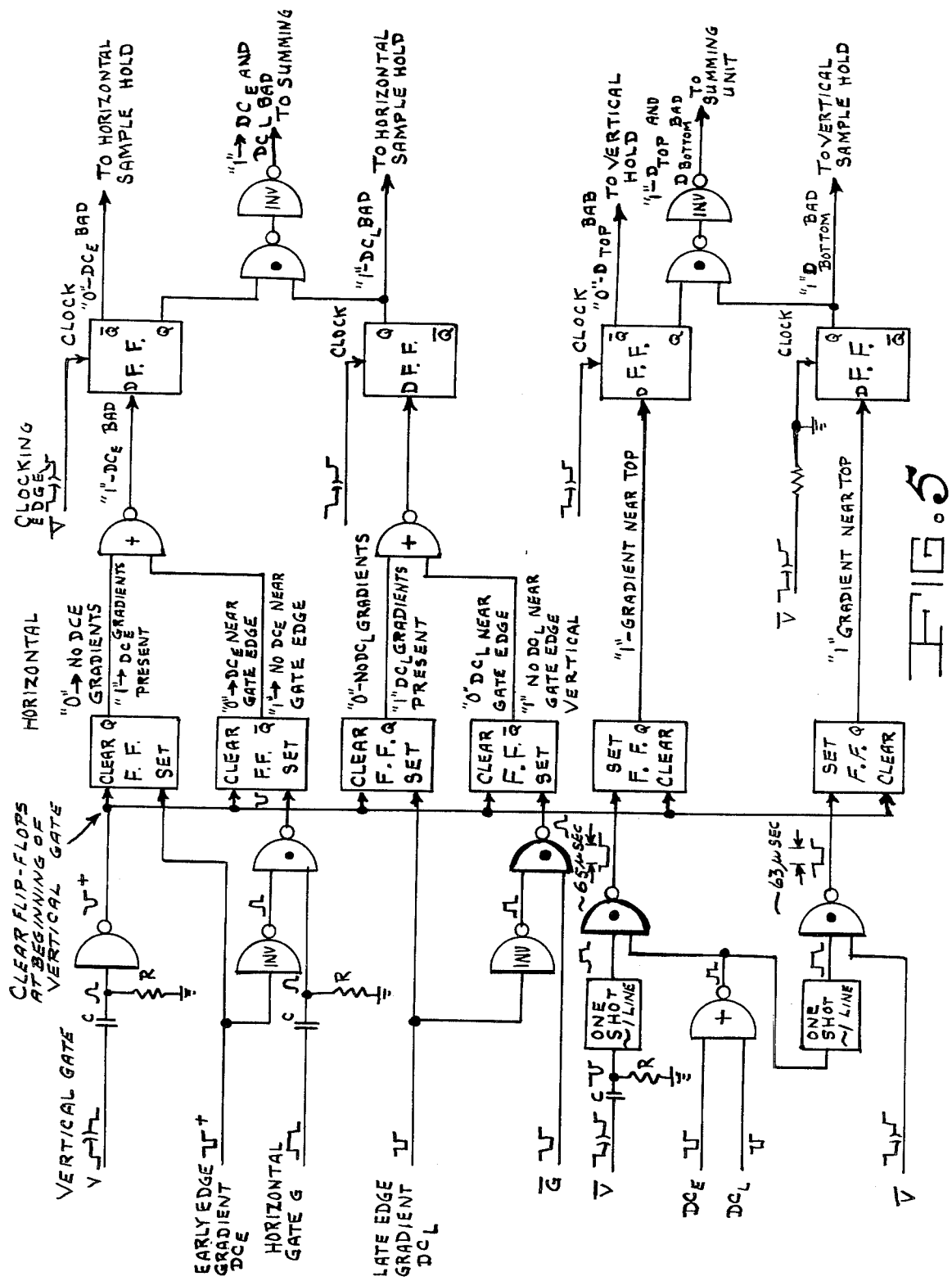

GATE TRACKING TECHNIQUE UTILIZING DIMENSION MEMORY

BACKGROUND OF THE INVENTION

The present invention relates broadly to a target tracking system and in particular to a tracking apparatus for measuring the position and dimensions of a target.

In the prior art, the target gate was adjusted on the basis of the gated portion of the target and not by the total target dimension. Thus, a prior art tracker apparatus would command the tracker gate to center itself on the portion of the target which is within the target gate within 1/60 of a second. The target gate, by a rather slow and tedious process of halving the error, would adjust its size to enclose the portion of the target which is in its view until the entire target is enclosed. Until the present time, the maximum theoretical tracking rate was limited to a ½ gate width dimension per field. In the present invention, the theoretical tracking rate has been shown to be 1 gate dimension. Thus, as long as some portion of the target is within the viewing apperture of the target gate, the tracker can snap the gate over the entire target in one field.

SUMMARY

The present invention utilizes a gate tracking loop to locate the extremities of the target and to define it in terms of ramp voltages. The voltages which correspond to the target edges are stored in a dimension tracker memory. Since the edges of the target are defined, the actual center of the target may be determined and a center voltage is obtained. In the event that a portion of the target extends outside the tracker gate, the tracking logic activates the dimension tracker memory to enclose the center voltage which is reference to the target edge that is within the gate. When the target is completely enclosed by the tracker gate, the tracker logic is reset and the dimension tracker memory may be updated to reflect changes in target size.

It is one object of the invention, therefore, to provide an improved target tracking system having the capability of accurately measuring the position and dimensions of a target.

It is another object of the invention to provide an improved target tracking system which adjusts the tracker gate size on the basis of the total target.

It is yet another object of the invention to provide an improved target tracking system wherein the gate rate of the tracker is one gate dimension per field.

It is still another object of the invention to provide an improved target tracking system wherein the tracker is capable of acquiring the entire target even though only a portion of the target is within the gate.

These and other advantages, features and objects of the invention will become more apparent from the following detailed description when taken in connection with the illustrative embodiment in the accompanying drawings.

BRIEF DESCRIPTION OF THE DRAWINGS

FIG. 2 is a block diagram of the dimension and center-processor;

FIG. 3 is a timing sequence illustrating a simplified single-axis step response;

FIG. 5 is a block diagram of the tracking logic circuit.

DESCRIPTION OF THE PREFERRED EMBODIMENT

In the present invention, horizontal and vertical voltage ramps are generated to match the system field of view, such that each point in the scene has an address. This address is determined by the interception of the target edges with the ramps. The extremes of the target are thereby located in terms of the ramp voltages.

Once the target gradients have been extracted from the clutter gradients, they can be fed to the gate tracking loop which operates to determine the left-most interception of a target leading edge $\delta_E$ and the horizontal ramp. This yields a voltage $V_{T_L}$ that is proportional to the position of the extreme left leading edge. A similar circuit determines the position of the extreme right trailing edge $V_{T_R}$ from the leading edge gradients $\delta_L$. The first target gradient ($\delta_E$ or $\delta_L$) to intercept the vertical ramp defines the position of the top of the target ($V_{T_T}$), and the last gradient defines the bottom of the target $V_{T_B}$.

The four analog voltages $V_{T_L}$, $V_{T_R}$, $V_{T_T}$, $V_{T_B}$ are used in the formulas below to generate the following information:

1. The target center at the $n^{th}$ sampling instant $V_{T_C(n)}$ which defines the desired gate center $V_{G_{C(n+1)}}$ at the $(n+1)^{th}$ sampling instant.

2. The target dimension $V_T$; which is increased by a pre-set multiple (which is slightly greater than unity) to form the gate dimension.

| | HORIZONTAL | VERTICAL |
|---|---|---|
| Gate Coordinates | $\frac{V_{T_L} + V_{T_R}}{2} \triangleq V_{T_{C_{\eta_H}}} \longrightarrow V_{G_{C(\eta+1)_H}}$ | $\frac{V_{T_T} + V_{T_B}}{2} \triangleq V_{T_{C_{\eta_V}}} \longrightarrow V_{G_{C(\eta+1)_V}}$ |
| Target Dimensions | $V_{T_L} - V_{T_R} \triangleq V_{T_H}$ | $V_{T_T} - V_{T_B} \triangleq V_{T_V}$ |
| Gate Dimensions | $(1 + \epsilon)(V_{T_L} - V_{T_R}) = \tau_H$ | $(1 + \epsilon)(V_{T_T} - V_{T_B}) = \tau_V$ |

Information on the target must be gathered during the time that the tracker is in operation and it must be processed and applied to the gate generator before the next gate is formed.

Figure 1:
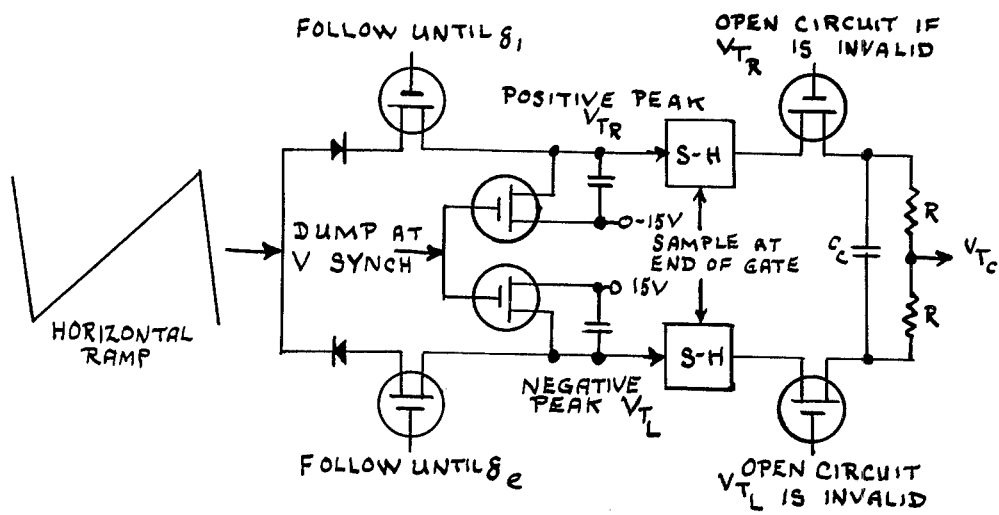
FIG. 1 is a schematic diagram of a simplified center memory unit.

The ideal error curve is implemented on by the center memory. If a portion of the target extends outside the gate, the tracking logic activates this memory. In this manner the actual center can be determined instead of the gated center. FIG. 1 is a simplified schematic of the center memory. The capacitor $C_c$ has stored the width of the target since the extreme right voltage $V_{T_R}$ was applied to one end and the extreme left voltage $V_{T_L}$ was applied to the other. This capacitor is deprived of a discharge path if either side of the target extends outside of the gate. Therefore, the center voltage is referenced to the side of the target that is within the gate. As soon as the target is completely enclosed by the gate, the tracking logic is reset and the capacitor can be updated to reflect changes in target size.

The dimension and center processor determines the locations of the extreme boundaries of the target and converts this information into gate size and position commands. The circuitry making up this processor is comprised mainly of voltage followers and series switches, in addition to the logic needed to activate these switches. A single axis block diagram of the dimension and center processor is shown in FIG. 2. While the circuit in FIG. 2 describes the processing of the horizontal ramp, the vertical ramp is processed in the same manner by a similar circuit.

The horizontal ramp is applied to amplifier 11 which drives capacitor $C_1$ through switch 12. Each target leading edge gradient activates the logic B that causes the switch 12 to open for 40 $\mu$sec. This truncated waveform is available at the output of amplifier 14 for comparison with the cumulative negative peak voltage on capacitor $C_2$. After a delay of 2 $\mu$sec, the output of the comparator 15 triggers the 40-$\mu$sec one-shot 16 if the instantaneous sample exceeds the cumulative peak. When this occurs, $C_2$ is updated to a new cumulative peak. This operation continues until the extreme left boundary of the target has been reached. Since a new cumulative peak is formed by the first target leading edge in the gate, there is always a valid starting point for updating, regardless of the direction of target motion between fields. This initial value is enabled by the vertical sync operating at terminal 17. At the end of the vertical gate, all possible target information has been acquired and stored. At this time, the extended $\overline{V}$ signal updates $C_3$ through switch 18. If the target is completely enclosed within the gate, the switch 19 is a short circuit (in the d-c contect).

If the tracking logic considers data regarding that target extreme boundary to be invalid, the switch 19 opens and remains open until that portion of the target is completely enclosed. Information regarding one valid extreme plus the memorized target dimension is sufficient for determining the target center. Turning now to FIG. 3, the following sequence of operations take place: at time, $t_o$, the first gated target leading edge updates the cumulative peak on Line D. The first gated target trailing edge updates the cumulative peak on Line H. Successive gradients update these peaks until the target extremes are reached.

At $t_1$: $\overline{V}$ extended ends, closes switches 20, 21, and thereby allows the stored values of D and H to be applied to E and I and to F and J. Since the target was completely enclosed, switches 22, 23 A have been and continue to be short circuits in the d-c context.

At $t_2$: V extended opens switches 20, 21 in order that no gate dynamics may take place during the gate.

At $t_3$: The first gated target edges update the cumulative peaks on Lines D and H. H soon peaks at the right edge of the gate and yields a false estimate of the position of the extreme right edge of the target. D updates until it reaches the actual left extreme of the target. The gate tracking logic determines that the right edge information is invalid since the right edge of the target intercepts the right edge of the gate.

At $t_4$: The gate ends and clocks the tracking logic so that the invalid state information is transferred to switch 23, which opens and remains open until the right edge of the target is enclosed in the gate. When switch 23 opens, it removes the discharge path from the dimension storage capacitor. Since switches 20, 21 are still open, no change occurs at points E, F, G, I, J, or K.

At $t_5$: $\overline{V}$ extended ends and closes switch 20 which applies D to G through switch 22. One end of the dimension storage capacitor has just been subjected to a change in voltage (G at $t_5$). Since switch 23 is open, no discharge can take place.

The capacitor therefore acts as a battery referenced to voltage G; the other end of the capacitor (K) must follow G with an offset equal to the target width voltage. Point K gives the position of the extreme right edge of the target, even if the target is outside of the gate. The gate is commanded to a position halfway between the target extremes.

At $t_6$: The gate begins; it is centered over the target.

At $t_7$: Points D and H update until the target extremes are located.

At $t_8$: The gate ends and clocks the tracking logic so that valid state information is transferred (the target is enclosed in the gate) to switch 23 which closes. Point I and therefore J are now able to drive point K. However, before any change can take place, $t_9$ occurs.

At $t_9$: V extended ends and closes switches 20, 21. No change takes place at points E and F since the extreme of D has the same value as it had during the last frame. Therefore there is no change in G. Points I and J are updated from the previous value of the gated extreme to that of the real extreme. If the target dimension remained constant during the last field, the predicted value of the right extreme is equal to the value determined by H at $t_9$. Therefore, the value of K remains unchanged.

Figure 4:
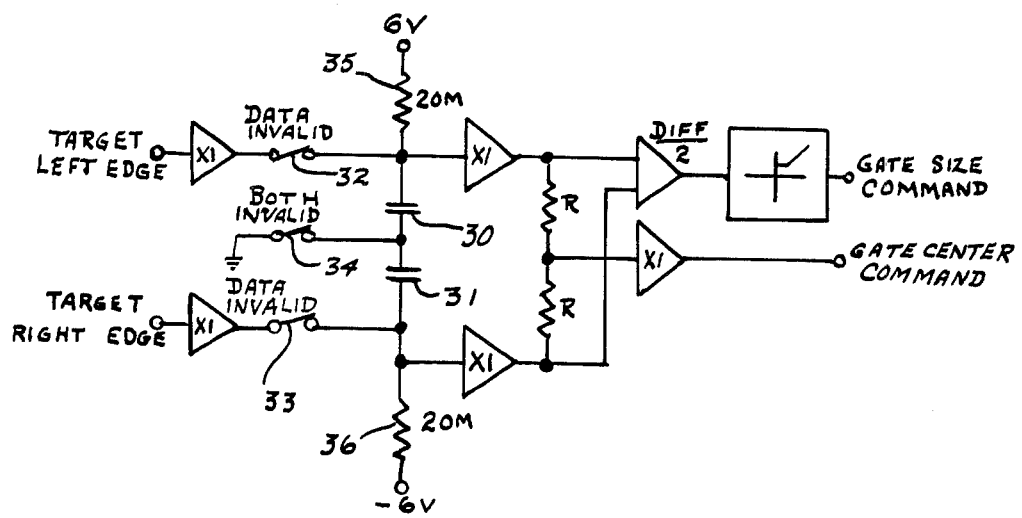
FIG. 4 is a block diagram of the gate center and dimension computer.

There is shown in FIG. 4 a gate center and dimension computer which converts the target positions into gate size and position commands. Each capacitor comprises a series of combination of two capacitors 30, 31 in which their common node can be switched to ground. If, after acquisition, the target is larger than the gate, the gate must grow horizontally until an edge is reached and the center of the target must not drift during this operation. When the joystick switch is depressed, it overrides the sampling logic and operates the FET switches. The input to the first amplifier in each of the four chains becomes ground instead of a ramp. Since all series switches become short circuits, the initial voltage across all of the capacitors is zero volts when the joystick is released. If the target is larger than the gate, there are no gradients available for sampling the ramps. Both horizontal "data invalid" switches 32, 33 open and the "both invalid" switch 34 closes. Current is supplied through the large resistors 35, 36 and as the voltage across the capacitor increases, it causes the gate to grow horizontally. A target edge eventually becomes enclosed within the gate. Data concerning this edge is now valid and the corresponding "data invalid" switch 32 or 33 closes. A voltage representing the correct data is now applied to that capacitor terminal by the low output impedance buffer which cancels the effects of the current supplied through the large resistor.

The "both invalid" switch 34 opens and thereby allows the center of the target to move in the same direction as the remaining gate edge, which is still growing as it searches for the other target boundary. When the gate reaches this boundary, a gradient will usually intercept the top or bottom of the gate. As a result, the same process is carried out vertically until the target is completely within the gate. The gate center command is always halfway between the extreme target voltages because of the symmetrical voltage divider across the capacitor. The dimension command is formed by generating a voltage that is equal to one-half of the difference between the extremes and by applying some size factor (normally 1.3) and a lower limit on size.

There is shown in FIG. 5, a block diagram of the tracking logic. The primary task of the tracking logic is to determine when a part of the target extends beyond the gate. When this situation occurs, this logic sends a signal to the position-dimension computer which rejects the computation of the characteristics of the gated target and enables the computer to determine the characteristics of the entire target. This logic comprises essentially four parts (one part verified the validity of each target extreme) and operates in the following manner:

If there are no target-leading edge pulses within the gate or if at least one such pulse intercepts the left edge of the gate, or if at least one such pulse intercepts the left edge of the gate, these situations imply that the target extends beyond the left side of the gate. If there are no target trailing edge pulses within the gate or if at least one such pulse intercepts the right edge of the gate, these situations imply that the target extends beyond the right side of the gate. If either a target leading edge or a trailing edge intercepts the top of the gate, this implies that the target extends beyond the top of the gate. If either a target leading edge or a target trailing edge intercepts the bottom of the gate, this implies that the target extends beyond the bottom of the gate. If both types of edge pulses are absent from the gate during the same field, this implies that the target is larger than the gate (as it may be during acquisition).

In all cases, data is collected and decisions are made during the gate, but they are not supplied to the position-dimension computer until the end of the gate in order to prevent any perturbation of the gate commands during the gate. In order to inhibit transfer, the information is applied shortly before the invalid data is to be transferred. If will be understood by those who are skilled in the art that the present invention utilizes conventional commercially available devices. Integrated circuits and field effect transistors lend themselves to the present invention.

Although the invention has been described with reference to a particular embodiment, it will be understood to those skilled in the art that the invention is capable of a variety of alternative embodiments within the spirit and scope of the appended claims.

I claim:

1. A target tracking apparatus to track and measure the dimensions of a target comprising in combination:

means for measuring the target extremities, said measuring means providing a gate to enclose said target, said measuring means generating a horizontal and a vertical voltage ramp, said horizontal and vertical voltage ramps defining the field of view of said target, said horizontal voltage ramp defining said target's left leading and right trailing edges, said vertical voltage ramp defining said target's upper leading and lower trailing edges, said horizontal and vertical voltage ramps provide four analog voltages, $V_{T_L}$, $V_{T_R}$, $V_{T_T}$ and $V_{T_B}$ which define the target extremities, a dimension and center processor unit receives said four analog voltages, $V_{T_L}$, $V_{T_R}$, $V_{T_T}$ and $V_{T_B}$ and stores their values, said dimension and center processor unit processes said four analog voltages to determine the center of said target, said dimension and center processor unit processes said four analog voltages to determine the locations of said target's extremities, said dimension and center processor unit generates gate size and position command signals relative to said target, and, a tracking logic unit for controlling said dimension and center processor unit, said tracking logic unit determining when a part of said target extends beyond said gate, said tracking logic unit adjusting said gate size to enclose said target, said tracking logic unit commanding said dimension and processor unit to enclose said target.

2. A target tracking apparatus as described in claim 1 wherein the voltage which correspond to the target edges are impressed upon a capacitor, said capacitor storing a voltage equal to the target dimension.

3. A target tracking apparatus as described in claim 2 wherein a preset multiple of the voltage across said capacitor is the gate size command signal.

4. A target tracking apparatus as described in claim 3 wherein said preset multiple is 1.3.

* * * * *